United States Patent [19]

Leupers

[11] Patent Number: 4,475,710
[45] Date of Patent: Oct. 9, 1984

[54] ELECTRO-HYDRAULIC CONTROL ACTUATOR FOR TURBINE VALVES

[75] Inventor: Hans-Joachim Leupers, Mülheim, Fed. Rep. of Germany

[73] Assignee: Kraftwerk Union Aktiengesellschaft, Mülheim, Fed. Rep. of Germany

[21] Appl. No.: 265,651

[22] Filed: May 20, 1981

[30] Foreign Application Priority Data

May 22, 1980 [DE] Fed. Rep. of Germany ....... 3019626

[51] Int. Cl.³ ........................................... F16K 31/122
[52] U.S. Cl. ...................................... 251/30; 60/413; 91/5; 91/450; 91/461; 251/63.6
[58] Field of Search ............... 60/413; 91/5, 449, 450, 91/461; 251/30, 63.5, 63.6

[56] References Cited

U.S. PATENT DOCUMENTS

| | | | |
|---|---|---|---|
| 2,938,346 | 5/1960 | Gratzmuller | 60/413 |
| 3,635,020 | 1/1972 | Mahlmann | 91/449 |
| 3,724,333 | 4/1973 | Fonden et al. | 60/413 |
| 3,913,883 | 10/1975 | Irwin | 251/63.6 |
| 4,070,831 | 1/1978 | Rutz | 60/413 |
| 4,085,587 | 4/1978 | Garlinghouse | 60/413 |
| 4,135,547 | 1/1979 | Akkerman et al. | 251/63.5 |
| 4,152,970 | 5/1979 | Hall et al. | 91/449 |

FOREIGN PATENT DOCUMENTS

| | | |
|---|---|---|
| 1183760 | 12/1964 | Fed. Rep. of Germany . |
| 2842846 | 4/1979 | Fed. Rep. of Germany . |
| 2232232 | 12/1974 | France .............................. 60/413 |

Primary Examiner—George L. Walton
Attorney, Agent, or Firm—Herbert L. Lerner; Laurence A. Greenberg

[57] ABSTRACT

In an electro-hydraulic control assembly for turbine valves, including a shaft for the turbine valve, a valve housing, electrical control means, an electro-hydraulic converter connected to the electrical control means, a hydraulic control cylinder being connected to the electro-hydraulic converter, a control piston being movable in the cylinder in a valve opening and a valve closing direction and being connected to the valve shaft, a force storing spring loading the piston in the valve closing direction, and a hydraulic system including a hydraulic fluid reservoir, a fluid pump being fed from the reservoir and having a pressure side, an electric motor for driving the pump and a hydraulic pressure accumulator connected to the pressure side of the pump, the improvement including a support structure disposed in the housing including two mutually parallel support plates, the spring being disposed between the support plates, the electro-hydraulic converter, the cylinder and the supply system being fastened to the support structure and being at least partially connected to each other by channels formed in the support plates.

6 Claims, 4 Drawing Figures

ELECTRO-HYDRAULIC CONTROL ACTUATOR FOR TURBINE VALVES

The invention relates to an electro-hydraulic control actuator for turbine valves, especially for control, rapid closure and by-pass valves for steam turbines, with electrical control means, an electro-hydraulic converter, a hydraulic control cylinder having a control piston which is connected with a valve shaft, and a hydraulic supply system which includes a fluid being fed from a hydraulic fluid reservoir and driven by an electric motor, and a hydraulic pressure accumulator connected to the pressure side of the fluid pump.

A similar electro-hydraulic control actuator for the control valve of a steam turbine is known from German Published, Non-Prosecuted Application DE-OS No. 28 42 846. The control actuator shown therein is controlled by the control signals and the fast trigger signals of an electric turbine control. These electric signals are converted in the electro-hydraulic converter to hydraulic signals and are also hydraulically amplified thereby, so that the large forces are generated which are required for controlling the regulating valve with the aid of the hydraulic control cylinder. The hydraulic supply system is not further represented or described, except for mentioning a hydraulic pressure accumulator.

In general turbine construction practice, the energy supply of the control actuators of the individual turbine valves is always effected by a central, hydraulic supply system which includes a central hydraulic fluid reservoir, and usually several fluid-pumps which work against hydraulic pressure accumulators. Thus, for the connection of a control actuator with the central hydraulic supply system, it is always necessary to have at least two pipe lines, one pipe line admitting the hydraulic fluid under high pressure, and the other pipe line returning the hydraulic fluid to the central hydraulic fluid reservoir when the load is taken from the hydraulic components. To assure the reliable transfer of the hydraulic energy, these pipe lines require considerable expenditures for their construction, quality assurance and maintenance. Beside pressure peaks and pressure fluctuations in long pipe lines, the stresses caused by thermal expansions must also be especially taken into consideration. Finally, the danger of fire caused by a fracture of a pipe in the high temperature zone must be considered. In this connection, with respect to fire protection, hydraulic fluids which are hardly if at all flammable must be added. However, hydraulic fluids of this type which are hardly flammable are costly, and also require costly maintenance measures as compared to hydraulic fluids based on mineral oil, due to their low stability. The use of double-walled pipes for better fire protection also causes considerable problems with respect to intallation and accessability.

It is accordingly an object of the invention to provide an electro-hydraulic actuator for turbine valves which overcomes the hereinaforementioned disadvantages of the heretofore-known devices of this general type, and which on one hand satisfies the high requirements with respect to control force and control speed, and on the other hand avoids the problems connected with the transfer of hydraulic energy by integration of the hydraulic supply system into the control actuator.

With the foregoing and other objects in view there is provided, in accordance with the invention, an electro-hydraulic control assembly for turbine valves, especially for control, rapid closure, and by-pass valves of steam turbines, including a shaft for the turbine valve, a valve housing, electrical control means, an electro-hydraulic converter connected to the electrical control means, a hydraulic control cylinder being connected to the electro-hydraulic converter, a control piston being movable in the cylinder in a valve opening and a valve closing direction and being connected to the valve shaft, a force storing spring loading the piston in the valve closing direction, and a hydraulic system including a hydraulic fluid reservoir, a fluid pump being fed from the reservoir and having a pressure side, an electric motor for driving the pump and a hydraulic pressure accumulator connected to the pressure side of the pump, the improvement comprising a support structure disposed in the housing including two mutually parallel support plates, the spring being disposed between the support plates, the electro-hydraulic converter, the cylinder and the supply system being fastened to the support structure and being at least partially connected to each other by channels formed in the support plates.

Because of the integration of the hydraulic supply system into the control actuator, the hydraulic pipe lines previously required to admit the hydraulic fluid are not required, and the expenditures associated with these pipe lines are avoided. Only wire cables are required for the energy supply of the control actuator and the conduction of the control signals and rapid trigger signals. These cables do not create any problems with respect to transfer reliability or fire protection. The integration of the hydraulic supply system into the control actuator, which is to be disposed in the valve housing under severely restricted space conditions, is made possible by the special construction of the support structure. The support plates of the support structure at the same time have a load-carrying and fluid-connecting function, so that connecting pipe lines between the components fastened to the side plates can be omitted to a great extent. In this manner, the size or structural volume of the control actuator which is constructed as a compact control unit, can be kept very small.

In accordance wwith another feature of the invention, the support plates have sides, and the support structure includes an end plate being fastened to one of the sides of each support plate and having a cross-connection or traverse channel formed therein. Such an endplate on one hand serves as an additional area for securing structural components, and on the other hand provides a hydraulic cross-connection between the two support plates and the components fastened thereto.

In accordance with a further feature of the invention, the end plate has regions extending beyond the support plates, and there is provided a fluid pump and an electric motor driving in fluid pump at each of the regions. In this way the operating safety of the control actuator is considerably improved, because when one of the two pumps becomes inoperative the other one can be turned on. An especially favorable space-wise arrangement results if in accordance with an added feature of the invention, the end plate has a first side facing the support plates and a second side facing away from the support plates, the fluid pumps being disposed on the first side of the end plate and the motors being disposed on the second side of the end plate. Therefore very short connecting passages are provided between the fluid pump and the support plates, and when the components fastened to the support plates.

In accordance with an additional feature of the invention, the reservoir is disposed at sides of the support plates which are opposite the end plate. Because of this arrangement of the relatively large hydraulic fluid reservoir, the space available for securing the other components at the support plates and at the end plate is practically not reduced.

A further improvement of the operation safety of the control actuator can be obtained, if in accordance with again another feature of the invention, there is provided at least one additional hydraulic pressure accumulator, at least one of the hydraulic pressure accumulators being fastened to each support plate at the sides to which the end plate is fastened. The storage volume of the pressure accumulators can be so specified that even if one pressure accumulator becomes inoperative, sufficient hydraulic fluid quantity is available for operating the hydraulic control cylinder.

In accordance with a concomitant feature of the invention, there is provided a column structure connecting the support structure to the valve housing. Therefore a slight alteration can be made if the natural frequency of the control actuator coincides with the excitation frequency of the turbine valve.

Other features which are considered as characteristic for the invention are set forth in the appended claims.

Although the invention is illustrated and described herein as embodied in an electro-hydraulic control actuator for turbine valves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
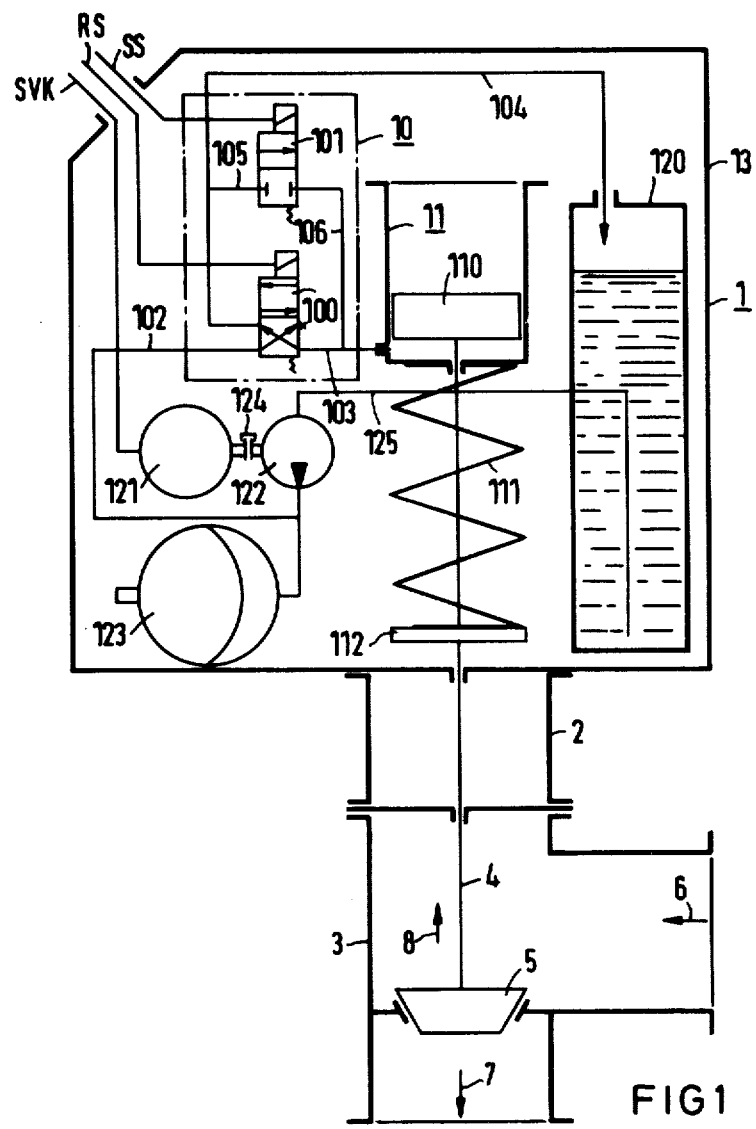
FIG. 1 is a schematic function diagram and diagrammatic view of a control actuator with an integrated hydraulic supply system.

Referring now to the figures of the drawing and first particularly to FIG. 1 thereof, there is seen an electro-hydraulic control actuator designated as a whole with reference numeral 1, which is combined with a turbine valve 3 through an intermediate structure 2. The turbine valve 3 is operated by the electro-hydraulic actuator through a connecting rod 4; the valve cone 5, shown in the closed position, being fastened to the lower end of the rod 4. The flow through the turbine valve 3, indicated by the arrows 6 and 7, is regulated by the corresponding raising of the connection rod 4 in the opening direction, indicated by arrow 8. The electro-hydraulic control actuator 1 essentially includes an electro-hydraulic converter 10, a hydraulic control cylinder 11 and a hydraulic supply system. The hydraulic supply system includes a fluid-pump 122 that is supplied from a hydraulic fluid reservoir 120 and driven by an electric motor 121, and also a hydraulic pressure accumulator 123 which is connected to the pressure side of the fluid pump.

All previously listed components are integrated to a compact actuating unit disposed at the turbine valve 3, so that the integration of the components is indicated in the diagrammatic view by a common housing 13.

The electro-hydraulic converter functions to convert the electric signals generated from a turbine control to hydraulic signals. For this purpose the embodiment shown includes a two-way valve 100 which is controlled by an electric control-signal RS, and an electric one-way valve 101 which is actuated by an electric trigger signal SS. The first inlet port of the two-way valve 100 is connected to the pressure side of the pump 122 and to the hydraulic pressure accumulator 123 over a line 102. The second inlet port of the two-way valve 100 is connected with the hydraulic control cylinder 11 by a line 103, while the third inlet port is connected to the hydraulic fluid reservoir 120 over an outflow line 104. The first port of the one-way valve 101 is connected to the outflow line 104 by a branch line 105, and the second port is connected over a branch line 106 and the line 103 to the hydraulic control cylinder 11. To open the turbine valve 3, the two-way valve 100 is set by a corresponding control signal RS, so that the space below a control piston 110 is filled with hydraulic fluid from the hydraulic pressure accumulator 123, and the valve cone 5 is moved in the opening direction 8 by the rod 4 which is connected to the control piston 110. During this opening motion a force storing spring 11 is tensioned at the same time. The spring is therefore arranged between the hydraulic control cylinder 11 and a plate 112, which is fastened to the connecting rod 4. To close the turbine valve 3, the two-way valve 100 is set by a corresponding control signal RS in such a manner, that the hydraulic fluid under the control piston 110 can flow off into the hydraulic fluid reservoir 120 over the outflow or drain line 104, and the spring force of the force storage spring 111 moves the control piston 110 and the valve cone 5 in the closing direction opposite to the arrow 8. In a corresponding manner for closing of the turbine valve 3 by a corresponding trigger signal SS, the one-way valve 101 is opened, so that the space below the control piston is relieved of pressure, and the forceful spring 111 can effect a rapid closing motion.

In the functional scheme of the electro-hydraulic control actuator 1 described and shown in FIG. 1, a configuration was chosen for the electro-hydraulic converter 10 which was as simple as possible. Since the control signals RS and the trigger signals SS, which have very low power levels, must be brought to a level of for example 10,000 times higher for generation of strong control forces, the electro-hydraulic converter 10 can also include one or more hydraulic amplification stages.

For generating the required hydraulic auxiliary energy, electrical energy is supplied over a current supply cable SVK, is converted to mechanical energy in the electrical motor 121, and finally the hydraulic fluid is sucked-in from the hydraulic fluid reservoir 120 by a pump 122, which is driven by the electric motor 121 through a clutch 124, and the fluid is transported into the hydraulic pressure accumulator 123. The maximal pressure of the filled hydraulic pressure accumulator 123 is, for example, 160 bar. In order to keep the size of the fluid pump 122 and the associated electric motor 121 as small as possible, the generated flow should only compensate for leakages occurring during operation, and should additionally have the capability of slowly filling the hydraulic pressure accumulator 123. This is achieved by suitably dimensioning the storage capability of the hydraulic pressure accumulator 123. The required supply of hydraulic fluid for the complete opening of the turbine valve 3, and for control motions which happen in rapid succession, must be completely furnished from the hydraulic pressure accumulator 123.

Figure 2:
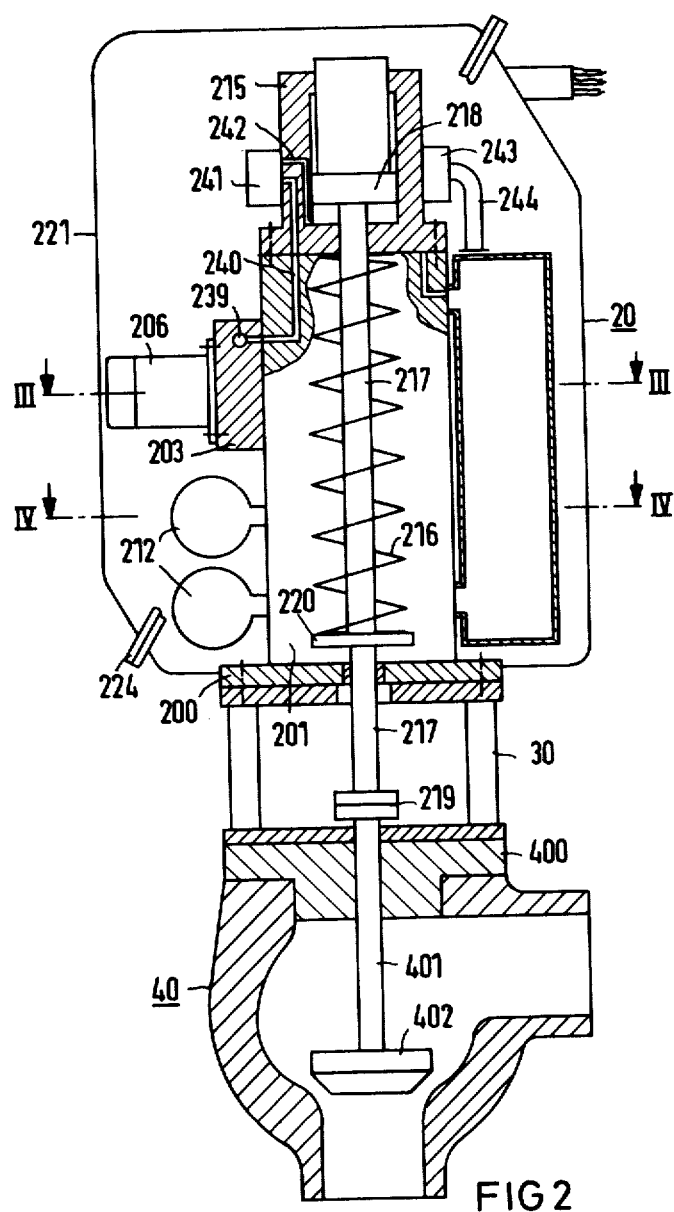
FIG. 2 is a diagrammatic longitudinal-sectional view, partly broken away through the electro-hydraulic actuator for the control valve of a steam turbine.
Figure 3:
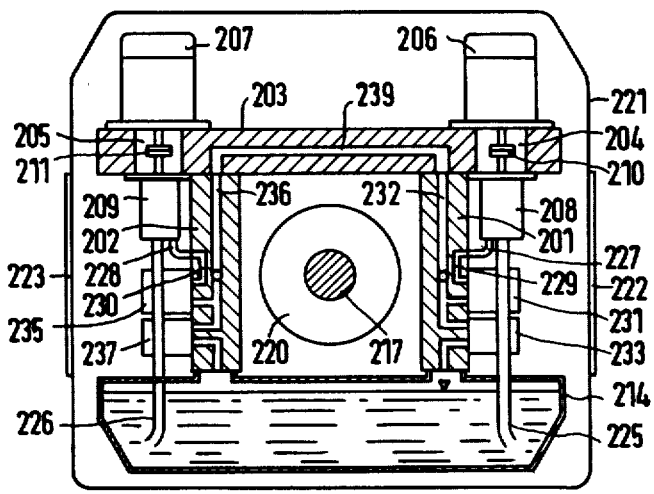
FIG. 3 is a cross-sectional view taken along the line III—III in FIG. 2 in the direction of the arrows.
Figure 4:
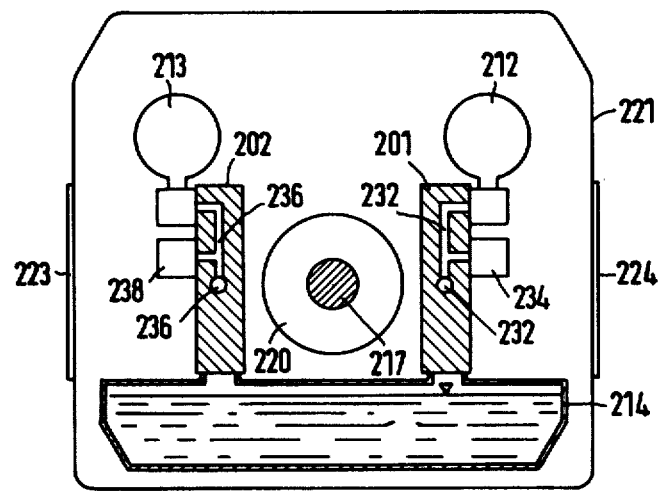
FIG. 4 is a view similar to FIG. 3, taken along the line IV—IV in FIG. 2, in the direction of the arrows.

FIGS. 2, 3 and 4 show, in a simplified representation, the construction of an electro-hydraulic actuator for the control valve of a steam turbine. The whole electro-hydraulic control actuator is designated in these figures with reference numeral 20, and it is carried by a column-structure 30, which in turn is fastened to the valve cover 400 of the control valve 40. A support structure for the electro-hydraulic control actuator 20 is present in the form of a base plate 200, two support plates 201 and 202, which are disposed vertically and spaced apart from each other on the base plate 200, and an end plate 203 which is fastened on the end of the support plates 201 and 202. Bores 204, 205 are provided in the sideward extending regions of the endplate 203, so that electric motors 206, 207, and fluid-pumps 208, 209 can be fastened by suitable flanges from the outside and inside, respectively. The clutch 210 for connecting the electric motor 206 with the associated fluid-pump 208 is therefore disposed within the bore 205, and the clutch 211 for connecting the electric motor 207 with the associated fluid-pump 209 is similarly disposed within the bore 205.

In the region between the end plate 203 and the base plate 200, there are disposed a total of four hydraulic pressure accumulators 212, 213. Two hydraulic pressure accumulators 212 are fastened with flanges to the side of the support plate 201, and two hydraulic pressure accumulators 213 are fastened with flanges to the side of the support plate 202. The two carrier or support plates 201 and 202 also serve for securing a hydraulic fluid reservoir 214 and a hydraulic control cylinder 215, in such a manner that the hydraulic fluid reservoir 214 is fastened at the sides opposite to the end plate 203, while the hydraulic control cylinder 215 is fastened at the ends opposite to the base plate 200. Because of this arrangement, the limited space between the two support plates 201 and 202, the end plate 203 and the hydraulic fluid reservoir 214 can be used for locating the power-spring 216 and the guide rod 217 of the hydraulic control cylinder 215. The guide rod 217 connects a control piston 218 of the hydraulic control cylinder 215 through a clutch 219 with a valve shaft 401, which carries at its end a valve cone 402 of the control valve 40. The power-spring 216 is disposed on the guide rod 217 between a plate 220, which is fastened to the guide rod 217, and the hydraulic control cylinder 215, in such a manner that it is tensioned by a suitable lifting motion of the control piston 218 when the control valve 40 is opened, and is capable of closing the control valve 40 again after the pressure is taken from control piston 218. A housing 221 is provided for covering the electro-hydraulic control actuator 20 which is fastened to the base plate 200, in such a way that the housing has two access covers 222 and 223 at its sides, and is partioned by a diagonal flange 224. The housing 221 serves the purpose of catching hydraulic fluid which may escape during installation and maintenance work, and to therefore exclude from the beginning of assembly the danger of a fire occuring because of the uncontrolled leakage of hydraulic fluid. For removal of heat generated by losses in the electro-hydraulic actuator 20, cooling air can be conducted by a non-illustrated blower between the housing 221 and the hydraulic fluid reservoir 214, which may possibly have cooling-ribs.

The two carrier plates 201 and 202 and the end plate 203, beside their above-described function as support structure, also have the additional purpose of connecting the elements which are fastened to them with each other, so that connecting pipes can be omitted to a great extent. Both fluid-pumps 208 and 209 are connected at their suction sides to the hydraulic fluid reservoir 214 through suction lines 225, 226, respectively, while at their pressure sides a connection with channels 229, 230 of the side plates 201, 202 is made by short pipe sections or arches 227, 228, respectively. The channel 229 in the support plate 201 leads to a check valve 231 which is connected to a pressure limiting valve 233 of the fluid pump 208, to the hydraulic pressure accumulators 212 and to their limiting valves 234, by a channel 232 which divides into several branches. In the same manner, the channel 230 in support plate 202 leads to a check valve 235, which is connected by a channel 236 with several branches to a pressure limiting valve 237 of the fluid pump 209, to the hydraulic pressure accumulators 213, and to their pressure limiting valves 238. The pressure-limiting valves 233 and 237 are connected with the hydraulic fluid reservoir 214 by channels which are not further described. The pressure limiting valves 234 and 238 are also connected with the hydraulic fluid reservoir 214 by channels which are not shown. A cross-connection channel 239 in the end plate 203 serves for the cross-connection of the fluid-pumps 208 and 209 and the hydraulic pressure accumulators 212 and 213. In addition to the cross channel 239, there are also provided branches corresponding to the channels 232, 236 in the support plates 201 and 202. The cross-connection channel 239 in conjunction with another channel 240 in the support plate 201 provides the connection between the hydraulic pressure accumulators 212 and 213 and the hydraulic control cylinder 215. The channel 240 leads to a first module 241 of an electro-hydraulic converter; the module 241 being connected by a channel 242 with a chamber below the control piston. A second module 243 at the control cylinder 215 of the non-illustrated electro-hydraulic converter is connected through a drainline 244 with the hydraulic fluid reservoir 214, so that when the control valve 40 is closed, the hydraulic fluid can be removed from the space below the control piston 218 in a manner which is not further shown in FIGS. 2–4 but is shown in FIG. 1.

In the typical embodiment of an electro-hydraulic actuator shown in FIGS. 2, 3 and 4, an extremely compact construction of the drive unit is made possible by the support structure including plates which simultaneously combine the supporting and connecting functions. In this way the easy ability to maintain the individual components is assured by the well organized and easily accessible arrangement of the individual components. Furthermore, a highly reliable operation is obtained with respect to the fluid pumps and hydraulic pressure accumulators by the symmetrical and redundant arrangement of the actuating unit.

There is claimed:

1. An electrohydraulic control assembly for a valve comprising, integrated in a compact control unit connectible with a housing for a valve, hydraulic control cylinder, an hydraulic fluid reservoir, an hydraulic fluid pump driven by an electric motor and an electrohydraulic converter connected to said control cylinder, said reservoir and said pump for adjusting the flow of hydraulic fluid to and from said control cylinder and said reservoir in accordance with electric signals transmitted thereto, two mutually spaced-apart support plates vertically disposed on a base plate connectible with the valve housing, said hydraulic cylinder being fastened to respective ends of said support plates facing away from said base plate, a transverse plate secured to respective edges of said support plates and extending across the space therebetween, a control piston disposed in said cylinder and having a shaft connectible with a shaft of the valve, said control piston being displaceable in a valve-opening and a valve-closing direction, a force-storing spring located between said support plates for loading said piston in said valve-closing direction, said hydraulic fluid reservoir being fastened to respective edges of said support plates facing away from said transverse plate, said pump and the electric motor for said pump being fastened to said transverse plate, an hydraulic pressure accumulator connected to said pump being fastened to said support plates, and hydraulic connecting means for hydraulically inter-connecting said hydraulic control cylinder, said hydraulic fluid reservoir, said electrohydraulic converter and said pump, said hydraulic connecting means being at least partly made up of channels formed in said support plates.

2. An electrohydraulic control assembly according to claim 1 including a transverse connecting channel formed in said transverse plate and connected to said channels formed in said support plates.

3. An electrohydraulic control assembly according to claim 2 wherein said transverse plate is formed with regions projecting laterally beyond said support plates, said electric motor and said pump being fastened to said projecting regions.

4. An electrohydraulic control assembly according to claim 2 wherein said hydraulic-fluid pump is mounted on a side of said transverse plate facing towards said support plates, and said electric motor is mounted on a side of said transverse plate facing away from said support plates.

5. An electrohydraulic control assembly according to claim 1 wherein said hydraulic pressure accumulator is fastened to a side of one of said support plates facing towards said transverse plate, and including at least another hydraulic pressure accumulator fastened to a side of the other of said support plates facing towards said transverse plate.

6. An electrohydraulic control assembly according to claim 1 including a column framework structure for supporting said support plates on the valve housing.

* * * * *